United States Patent [19]

Mercik, Jr. et al.

[11] 4,064,746
[45] Dec. 27, 1977

[54] PARAMETER CONTROLLED SPEED DETERMINATION IN INTERNAL COMBUSTION ENGINE DIAGNOSTICS

[75] Inventors: Henry J. Mercik, Jr.; Lee R. Armstrong, both of Enfield, Conn.

[73] Assignee: United Technologies Corporation, Hartford, Conn.

[21] Appl. No.: 684,039

[22] Filed: May 7, 1976

[51] Int. Cl.² ............................................. G01L 3/00
[52] U.S. Cl. ..................................................... 73/116
[58] Field of Search ................... 73/116, 117.3, 118, 73/119, 168; 324/16 R, 161; 235/150.2, 150.3; 116/114 AE

[56] References Cited

U.S. PATENT DOCUMENTS

| B 569,859 | 3/1976 | Hanson | 73/116 |
| 3,691,824 | 9/1972 | Vanderbilt et al. | 73/118 |
| 3,960,011 | 6/1976 | Renz et al. | 73/116 |
| 3,964,301 | 6/1976 | Hanson et al. | 73/116 |

OTHER PUBLICATIONS

Roper, Rotary Pumps for the Trucking Industry, pp. 1-12, Bulletin 62-6, Apr. 1967.
Blackmer, Rotary Truck and Transport Pumps, pp. 1-12, Bulletin 200/3, Apr. 1967.

*Primary Examiner*—Richard C. Queisser
*Assistant Examiner*—Anthony V. Ciarlante
*Attorney, Agent, or Firm*—M. P. Williams

[57] ABSTRACT

A parameter, such as oil pressure, is repetitively sampled along with indications of speed, such as clock counts from a flywheel tooth counter, the parameter value and speed indications being stored and retained through at least several samplings, the parameter samplings being analyzed to find one of interest, the related speed indication thereupon being converted into speed dimensions for use. Specifically, oil pressure and engine speed indications are simultaneously sampled and stored, being retained for several sampling intervals, successive pressure readings are compared to find the knee in the curve of oil pressure as the pressure regulator begins to cut in, the pressure ultimately determined to be at the knee and the related speed indication being brought out for use, with conversion of the speed indication to rpm dimensions.

9 Claims, 4 Drawing Figures

PARAMETER CONTROLLED SPEED DETERMINATION IN INTERNAL COMBUSTION ENGINE DIAGNOSTICS

CROSS REFERENCE TO RELATED APPLICATIONS

Some of the subject matter herein is disclosed and claimed in commonly owned copending applications filed on even date herewith by Willenbecher et al, Ser. No. 684,036, entitled SPEED-RELATED INDICATION COMPARISONS IN INTERNAL COMBUSTION ENGINE DIAGNOSTICS, by Stick et al, Ser. No. 684,037, entitled DETERMINATION OF NUMBER OF TEETH ON AN INTERNAL COMBUSTION ENGINE FLYWHEEL; by Rackliffe et al, Ser. No. 684,220, entitled SUB-CYCLIC MEASUREMENT OF SPEED OF AN INTERNAL COMBUSTION ENGINE.

BACKGROUND OF THE INVENTION

1. Field of the Invention

This invention relates to diagnosing internal combustion engines electronically.

2. Description of the Prior Art

In modern diagnostic systems, the accurate analysis of the health of various engine subsystems is necessary. One such example is the lubricating oil subsystem in an engine. Factors which are desired to be known are the pressure at which the pressure regulator operates, the general health of the pump, the degree of restriction in the oil labyrinth in the engine, including blockages, worn bearings and the like. This information can be derived by relating engine oil pressure to speed, but tests of that nature have heretofore required the use of a dynomometer.

There are other tests in which engine parameters are related to speed, and in which the particular speed at which a given condition of the engine parameter occurs may be of interest.

SUMMARY OF THE INVENTION

Objects of the invention include provision of improvements in parameter controlled speed determinations and improvements in lubricating oil subsystem diagnostics, for internal combustion engines.

According to the present invention, samplings of a speed indication are made simultaneously with samplings of another parameter of the engine and stored over a sampling interval, while processing of parameter samples determines a parameter sample of interest, the storage sample of interest and the speed indication thereupon being identified, only the speed indication relating to the sample of interest being converted to speed dimensions.

According further to the invention, the lubricating oil system of an internal combustion engine is diagnosed by sampling indications of speed simultaneously with oil pressure, analyzing the oil pressure samples to find the knee in the normal oil pressure/speed profile, and providing the pressure and speed, in speed dimensions, relating to the knee and the curve.

The present invention provides for rapid measurements involving speed by delaying conversion of speed into speed coordinates until data sampling and analysis is complete. By means of the foregoing, the present invention provides a significant diagnosis of the lubricating oil system of an engine by indicating not only the pressure at which the pressure regulator becomes effective, but the speed required to drive the pump sufficiently to reach the pressure. This provides an indication of pump health as well as an indication of engine health, in addition to indicating regulator pressure.

The foregoing and various other objects, features and advantages of the present invention will become more apparent in the light of the following detailed description of a preferred embodiment thereof, as illustrated in the accompanying drawing.

DESCRIPTION OF THE PREFERRED EMBODIMENTS

Figure 1:
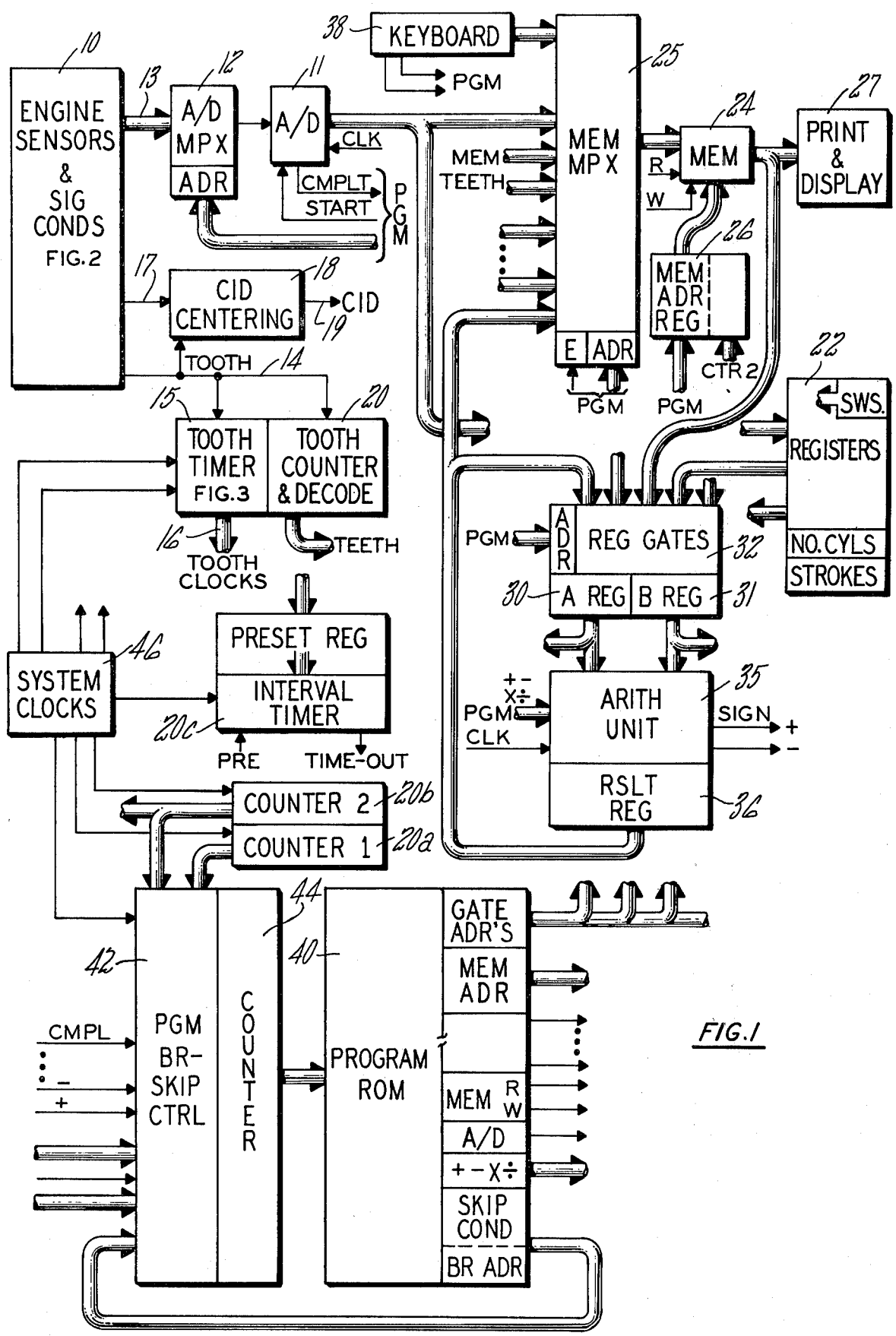
FIG. 1 is a simplified schematic block diagram of a diagnostic system including engine parameter sensing apparatus and exemplary electronic processing apparatus, in which the present invention may be incorporated.

Referring now to FIG. 1, a system which may incorporate the present invention is illustrated as representing the architecture of a typical data processing system or computer together with special purpose apparatus related to an engine diagnostic system of the type in which the invention may be incorporated. Specifically, the system incorporates engine sensors and signal conditioners 10 of a well known type which are adapted to be disposed for response to various parameters or discrete conditions on an engine under test, as described more fully hereinafter. Some of the sensors relate to pressures, temperatures and the like and are therefore analog signals, the magnitude of which is a measure of the parameter being sensed. The output of the sensors are fed over lines 13 to an analog to digital converter (A/D) 11 when selected by an A/D multiplexer 12 in response to a particular sensor address applied thereto by the program of the data processor. In addition, a tooth sensor may sense the passage of teeth on the flywheel of the engine to provide a tooth signal on a line 14, the intertooth time interval of which (when the engine is running) is measured by a tooth timer 15 and provided on tooth count lines 16. Another discrete signal is a cylinder or cycle identification signal (CID) on a line 17 which is applied to a CID centering circuit 18 to provide a CID signal on a line 19. The raw CID signal on the line 17 is a signal from a proximity sensor disposed to sense movement of an engine member once in each cycle of the engine, such as the rocker arm for the intake valve of one of the cylinders or a cam, if desired; this provides information of the cylinder-by-cylinder position of the engine at any moment in time in the same fashion as the number one firing in a spark ignition engine, and also provides cycle-to-cycle division of the engine's angular position as it is running or cranking.

In accordance with the invention, the parameters of the engine as provided through the A/D converter 11, and the instantaneous position information with respect to the engine as provided by the CID signal on the line 17 and the tooth signals on the line 14 may be used in diagnosis of the engine in accordance with the invention herein.

Additional special apparatus which may be used (although as described hereinafter is not necessarily required) includes a tooth counter and decode circuit 20, and a pair of counters 20a, 20b referred to as counter 1 and counter 2, and an interval timer 20c, and special purpose registers 22, which may be used (as an alternative to memory) to retain certain factors that are used so often as to render it advisable to have them directly available to the program rather than having to access them in memory, in order to cut down processing time and complexity of programming. Such registers may contain factors utilized in processing data (such as multiplicands used in digital filtering of the data and the like) and information relating to the particular engine under test (such as number of strokes and cylinders) which may be entered by switches manipulated by an operator, the switches feeding binary decode circuits such that the decode constantly reflects the position of the switch on a steady state basis in the manner of a register.

The remainder of FIG. 1 is illustrative of one type of data processing apparatus, which is shown for illustrative purposes herein since it is a type that may be advantageous for use where general purpose programming is not required, but rather limited functions are to be performed. A computer, as is known in the art, includes memory (or accessible storage), and arithmetic unit, program control, and the necessary gates, data flow and event decode or monitoring circuits so as to permit advancing logically through the steps which are to be performed. Specifically, a memory 24 may be loaded from a variety of inputs shown on the data flow under control of a memory multiplexer 25 which is enabled and addressed by the program so as to select which of the possible inputs to memory are to be applied thereto, if any. The memory 24 is responsive to a memory address register 26 which may respond to a counter used in program control in a usual fashion. The output of the memory is available to other portions of the data flow, such as print and display apparatus 27 and the arithmetic apparatus including arithmetic unit input registers, referred to herein as an A register 30 and a B register 31 under control of register gates 32 which are controlled by the program in a known fashion. Herein, the output of the A register and the B register is available to the register gates 32 and to the main data flow, so that their contents may be moved between the registers 30, 31 or to the memory 24. This is to facilitate the particular type of processing which may be employed in an engine diagnostic system, as is described more fully hereinafter. The registers 30, 31 feed an arithmetic unit of a known type 35, the function of which, controlled by the program, is to add, subtract, multiply or divide, to provide answers to a result register 36 as well as providing indications of the sign of the result. As indicated in FIG. 1, the result register may be available at the input to the arithmetic unit through the gates 32; alternatively, as is common in many computers the result register could be automatically one of the inputs to the arithmetic unit, and it can be loaded directly from the memory upon a proper command.

In order to provide data inputs to the memory for initialization and to permit a degree of control over the system during processing, a keyboard 38 of a usual variety may be provided. In addition to data inputs, the keyboard may have control function keys that permit choice to the operator of loading memory from the result register or of loading memory in response to the keyboard, depending upon conditions which may be displayed in the print and display apparatus 27.

For the rather limited number of tests being performed in apparatus incorporating the present invention, the program may be controlled in a variety of ways. One way is a program ROM 40 which provides input gate addresses to control the inputs to the memory, the arithmetic input registers, and the A/D converter, etc.; the memory address; the functions to be performed by the arithmetic unit, and other commands such as commands to the memory to cause it to read or write, and to start the A/D converter 11, and the like. Sequencing is controlled by unconditional branch instructions (which provide a branch address) and by skip instructions (dependent on conditions) provided to a branch/skip control 42 at the input to the program counter 44, which is also responsive to system clocks 46. Thus, as is known, for each program clock signal received from the system clocks, the program counter may be advanced, skipped once or twice, or reset to the branch address, in dependence upon the presence of branch or skip instructions.

It should be understood that the particular processing apparatus used, and the degree of use of special purpose apparatus, is dependent upon the particular implementation of the present invention which is to be made, and forms no part of the present invention. If the invention is utilized in a complex, sophisticated diagnostic system in which a variety of diagnostic functions are required, then the type of apparatus selected for processing may be more sophisticated and capable of general purpose utilization in order to accommodate the special requirements of all of the diagnostic procedures to be performed. However, the cost of programming complexity of such a processing system may be unwarranted in a diagnostic system which performs either relatively few or relatively simple tests. As is more apparent in the light of detailed operational descriptions hereinafter, well known processing systems (such as NOVA and PDP/11) employing only programs provided through techniques well known in the art, may be utilized in conjunction with the engine sensors and conditioners 10, suitable input and output apparatus (such as the keyboard 38 and the print and display apparatus 27) and, depending on the processing power of the data processing system selected, some special purpose hardware which may be found advisable, such as the tooth timer 15, the tooth counter 20 and some special registers 22. However, the well known processing systems referred to hereinbefore can provide adequate memory capacity to perform the tooth timing and counting functions, and to provide for the storage of all required parameters and engine information in the memory, as is readily apparent to those skilled in the art.

Figure 2:
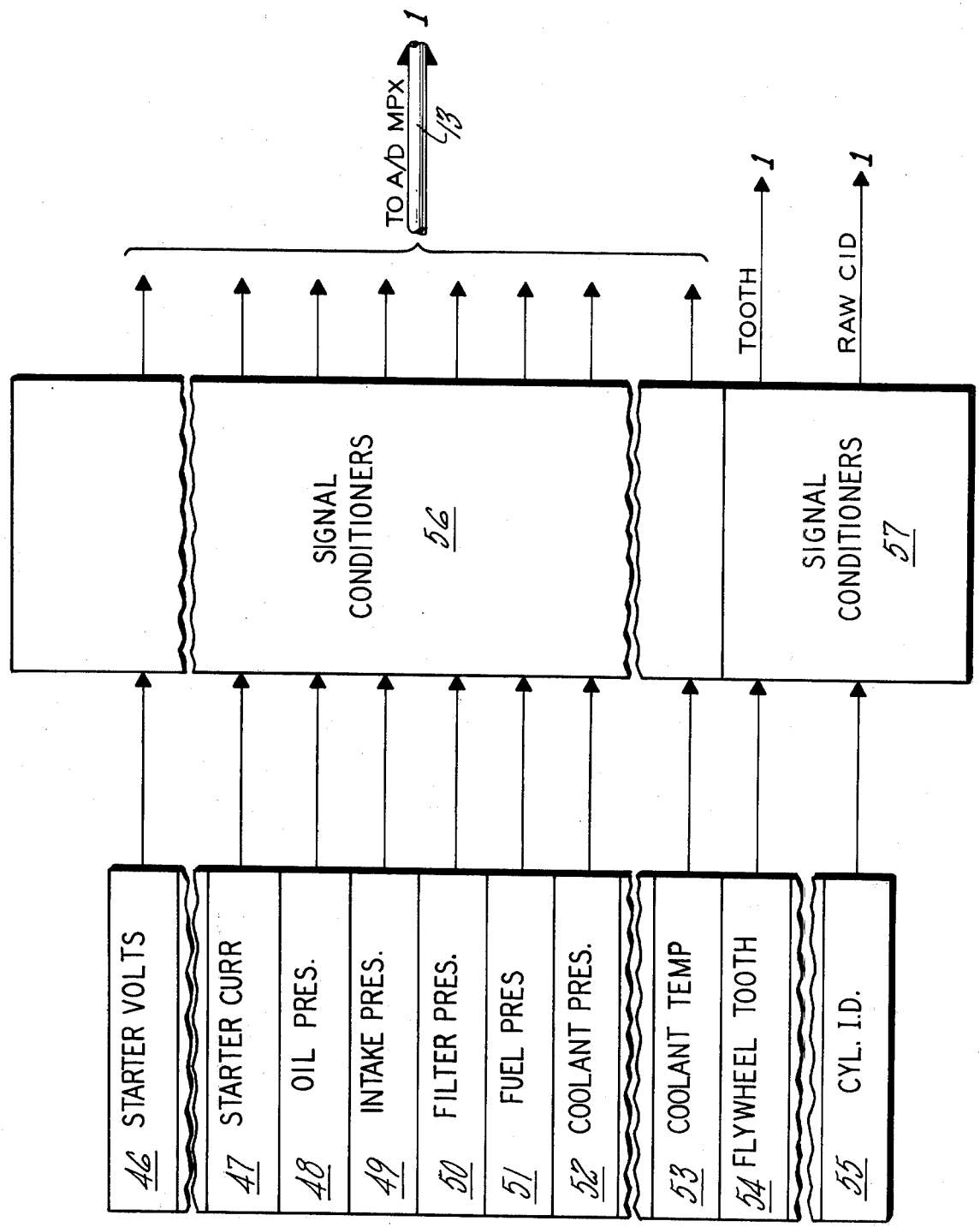
FIG. 2 is a simplified block diagram of engine parameter sensing apparatus for use in the embodiment of FIG. 1.

Referring now to FIG. 2, a plurality of engine sensors in a diagnostic system incorporating the present invention may include, among others not shown in FIG. 2, a starter voltage probe or clamp 46, a starter current probe 47, an oil pressure transducer 48, which could be disposed in general proximity to the engine under test, a pressure transducer 49 to measure the intake manifold air pressure, a filter pressure transducer 50 to measure the pressure of the fuel downstream of the fuel inlet filter, a fuel pressure transducer 51 to measure the pressure at the fuel injector inlet rail of the engine, a coolant pressure transducer 52 which may preferably measure the pressure of coolant at the inlet to the coolant thermostat, a coolant temperature transducer 53 to measure coolant temperature, preferably at the inlet to the thermostat. In a diagnostic system incorporating the present invention there may also be a proximity sensor 54, which may comprise an RGT Model 3010-AN Magnetic Proximity Sensor, provided by Electro Corporation, Sarasota, Florida, for sensing the passage of flywheel teeth past a particular point adjacent to the flywheel housing, and a proximity sensor 55 such as a Model 4947 Proximity Switch distributed by Electro Corporation, for sensing the presence of an engine member which moves in a unique fashion once in each cycle of the engine, which is one revolution in a two stroke engine or two revolutions in a four stroke engine. The proximity sensor 55 may preferably be mounted through the valve cover adjacent to a rocker arm related to the intake valve of one of the cylinders of the engine, thereby to provide information as to the particular point of an engine cycle once in each cycle, as well as to delineate successive engine cycles as the engine is rotating.

Each of the sensors of FIG. 2 is applied to a suitable one of a plurality of signal conditioners 56, 57 to filter out unwanted noise, and to provide, through an amplifier, suitable level adjusting as is appropriate for the circuitry being fed thereby. For instance, the signal conditioners 56 scale the signals to the proper level so that each of them can be fed through a common A/D converter 12 (FIG. 1). The signal conditioners 56, 57 can be suitable ones of a wide variety known in the art, and form no part of the present invention.

Figure 3:
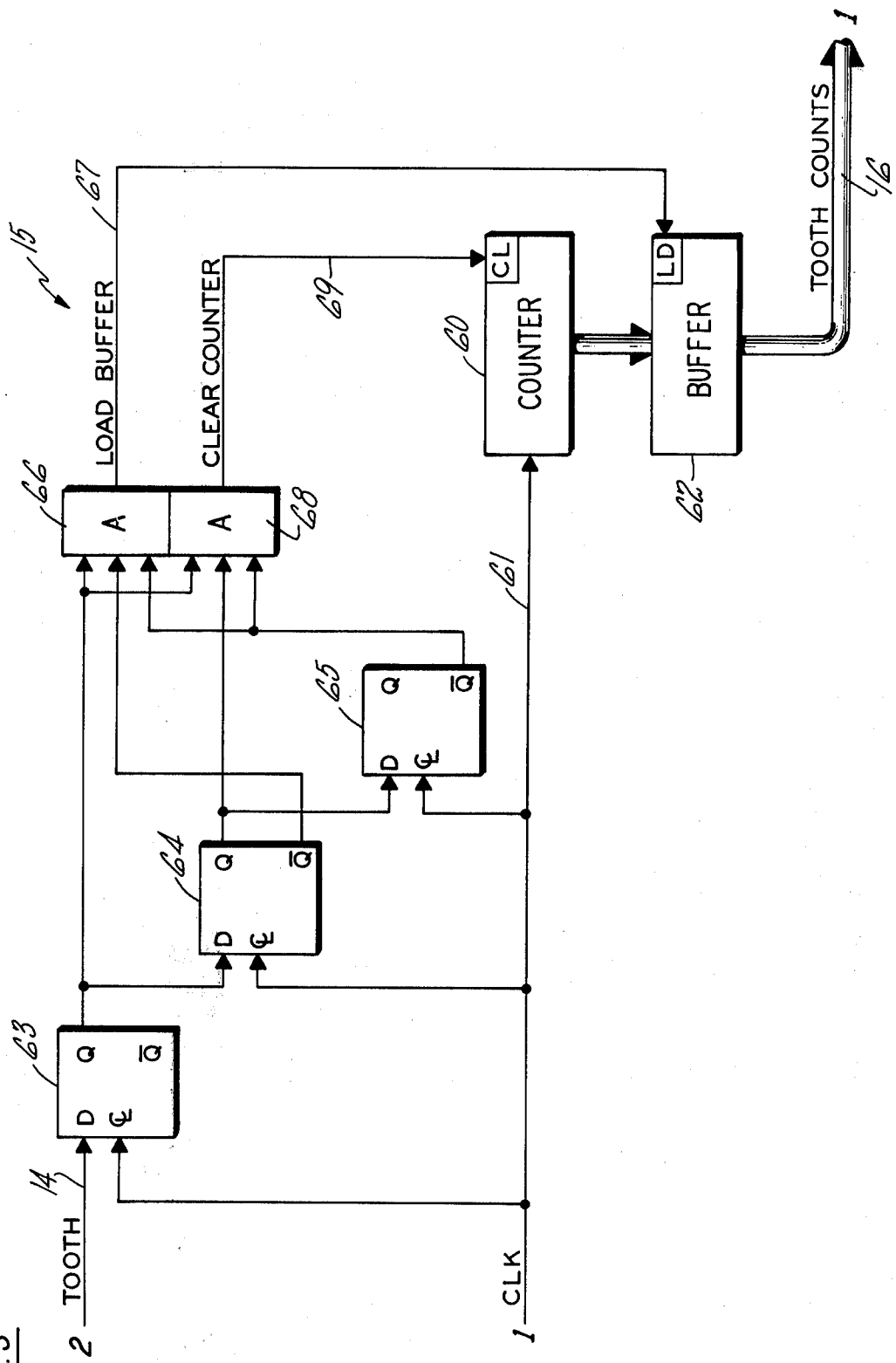
FIG. 3 is a simplified schematic diagram of tooth timer means for obtaining instantaneous, sub-cyclic engine speed in the embodiment of FIG. 1.

Referring now to FIG. 3, the tooth timer 15 includes a counter 60 which repetitively counts clock pulses on a line 61 that may be supplied by system clocks 46 in FIG. 1. The counter is parallel-fed to a buffer 62, the output of which comprises the tooth counts. The counter is running substantially all of the time since a very high frequency clock signal can be utilized on the line 61 (anywhere from tens of KHz to tens of MHz) whereas at speeds from 300 rpm to 2,000 rpm the frequency of the tooth signals on the line 14 may be on the order of 10 Hz to 100 Hz, depending upon the number of teeth. Thus the few clock signals lost during the tooth to tooth resetting of the counter are miniscule.

Each time that a tooth signal appears on the line 14, the next clock signal will set a D-type flip flop 63, the Q output of which is applied to a D-type flip flop 64. The second clock signal following the tooth signal therefore sets the D-type flip flop 64, and since its Q output is applied to a D-type flip flop 65 the third clock signal will cause it to become set. The very first clock signal, after the appearance of the tooth signal, is decoded by an AND circuit 66 since it responds to Q of flip flop 63 and not Q of flip flop 64 and 65; this provides a load buffer signal on a line 67 to cause the buffer 62 to be loaded in parallel from the counter 60. The second clock signal following the appearance of the tooth signal will cause an AND circuit 68 to respond to the Q of flip flops 63 and 64 and the not Q of flip flop 65 so as to generate a clear counter signal on a line 69 which is applied to the clear input of the counter 60 causing it to be cleared to zero. The third clock signal, by setting the flip flop 65, simply eliminates the clear counter signal on the line 69 so that the next leading edge of the clock signal and all subsequent clock signals will be counted in the counter 60. Whenever the tooth signal disappears, (which is totally immaterial) the next three clock signals in a row will cause resetting of the flip flops 63–65, in turn, since each of their D inputs will go down. The counter and the buffer are independent of the resetting of the flip flops 63-65 since both AND circuits 66, 68 operate only during a progression with flip flop 63 on the flip flop 65 off, which does not occur during the resetting of the flip flops.

Thus the tooth timer 15 provides tooth counts on the line 16 which are stable, throughout substantially each intertooth interval. The processing apparatus of FIG. 1 may therefore sample the tooth counts at random. The tooth timer 15 thereby provides very accurate, subcyclic speed measurement, on a tooth to tooth basis, which provides speed indications many times within each individual cylinder stroke portion of each engine cycle.

In the detailed description of exemplary processing hereinafter, the term "ringgear" is sometimes used in place of "flywheel"; they mean the same thing; the abbreviation "RGT" means "ringgear teeth," a stored factor indicating the number of teeth on the flywheel of the engine under test. This may be determined and entered from engine specifications, or as set forth in a commonly owned copending application of Stick et al, Ser. No. 684,037, entitled "Determination of Number of Teeth on an Internal Combustion Engine Flywheel." Other abbreviations include: "RSLT" = result register; "MEM" = memory; "Ctr" = counter; "Factor" means a memory location or a register where the factor is available; "CMPLT" means A/D conversion is completed; "spd" means speed; and other abbreviations are apparent in the drawing. Parentheticals after "MEM", such as "(Freq)," indicate addresses, chosen at will by the programmer, or partially determined by counter two, if so indicated.

The exemplary system herein is designed for four-stroke, six-cylinder engines. If desired, the programming may be altered to compare counts (particularly counter two) with loaded indications of engine variables, such as cylinders, in a well known fashion.

Figure 4:
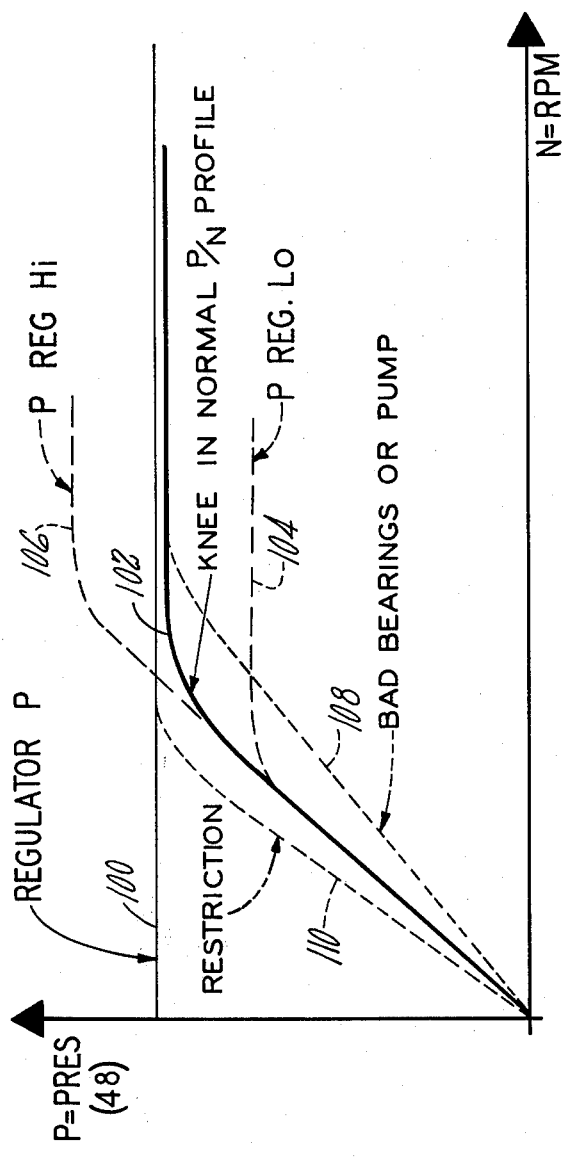
FIG. 4 is a diagramatic illustration of principles of the invention.

Referring now to FIG. 4, the principles of the present invention are illustrated. In FIG. 4, the normal regulator pressure for an oil system is shown by the horizontal line 100. The normal pressure versus speed profile is shown by the heavy curve line 102. A case where the pressure regulator is regulating the pressure too low is illustrated by the dash line 104, and a condition where the regulator is set too high is indicated by the dash line 106. Obviously, if this were all the information that were required, then one could simply sense the pressure at high idle to determine which condition illustrated by the curves 102, 104, 106 is exhibited by the pressure regulator. However, the present invention also provides information as to whether proper lubrication is being performed by determining the speed at which the knee in a normal pressure/speed profile is achieved. For instance, if it is achieved at too high a speed as indicated by the dash line 108, then this means that the pump is driving too small a restriction, indicating wear or eccentricity in the bearings. On the other hand, if the pressure builds up too fast as indicated by the dash line 110, then this would indicate that there is an excessive restriction in the oil labyrinth meaning that some part of the engine is given inadequate lubrication. These factors can be determined because the pump is normally a gear type pump, which is driven directly by the engine, and so its pressure versus speed output is relatively fixed from engine to engine, and the pumps almost never fail. On the other hand, if a pump does fail it will provide an indication more or less the same as that indicating bad bearings so that a failure will in fact be indicated in either case.

The present invention measures the oil pressure of an engine while it is accelerating with only itself and its own accessories as a load, over discrete time intervals. Because an engine accelerates substantially linearly, the discrete time intervals will very closely approximate linear increases in speed of the engine as it accelerates. For each time that the oil pressure is measured, the rate of change of pressure is measured, and thereafter the knee in the P/N curve is identified, and the pressure and speed at that point are recorded.

The present test is done during an acceleration, so the fact that an acceleration is occuring must be known. Obviously, when an operator opens the throttle of the engine to get a snap acceleration, he knows that it is accelerating; however, to reduce wasted operating time and to assure proper operation, it is preferable to start the test and wait for the operator to accelerate the engine, sensing a threshold speed that is above low idle to indicate that the acceleration is in process. Such a speed may be on the order of 900 rpm, although this is adjustable to suit any particular implementation of the present invention.

To sense a threshold speed at the beginning of the snap acceleration, the teachings of the aforementioned Willenbecher et al and Rackliffe et al applications may be utilized. For the easiest sensing of speed, a speed factor can first be calculated such that the counts established in the tooth timer can be compared directly therewith, and when the tooth time counts become smaller than those indicated by the factor, the desired speed is known to have been reached. When sensing speed by tooth-to-tooth time intervals of flywheel teeth as they pass a sensor, the speed is equal to the ratio of one tooth to the total number of teeth (RGT) on the flywheel, all of which is divided by the ratio of counts during the tooth interval to the frequency of the clock driving the tooth timer. This provides speed in revolutions per second, and must be multiplied by 60 in order to indicate speed in rpm's. Simplified, the speed in rpm's is equal to 60 times the frequency of the clock all of which is divided by the number of teeth on the flywheel times the number of counts in the tooth timer. Transposing the position of speed in rpm and counts in the timer, the counts in the timer indicative of any particular speed is equal to the product of frequency of the clock times 60, all of which is divided by the desired speed in rpm's times the total number of teeth (RGT) on the flywheel. The predetermined speed factor can be determined and made ready for use in accordance with the following exemplary instructions:

1. Load MEM (Freq) to A REG
2. Load MEM (RGT) to B REG
3. Divide
4. Load RSLT to A REG
5. Load MEM (Start Spd) to B REG
6. Divide
7. Load RSLT to A REG
8. Load 60 Factor to B REG
9. Multiply
10. Load RSLT to B REG Then the system can simply monitor the tooth timer counts, continuously subtracting the tooth timer counts from the predetermined counts. Since counts become smaller and smaller as the speed increases, when the speed of the engine exceeds the predetermined speed, then the predetermined counts will exceed the tooth timer counts and this can be determined by doing a reverse subtract and looking for a negative result as set forth in the following instructions:

11. Load Tooth timer to A REG
12. Subtract; Skip one if —
13. Branch to 11

In the present example, oil pressure and tooth timer readings are taken repetitively in response to elapse of a constant sampling rate time interval, which may be on the order of 50 milliseconds. This may be provided by inherent time delays in the program of the computer, or it may be provided by inherent time delay in the sampling capacity of an A/D converter used to convert the pressure measurements into digital readings; however, herein the 50 millisecond interval is provided by the interval timer 20C. Depending on the frequency of clock used to drive the interval timer, a preset factor can be determined, which is used to preset the interval timer every time that it is started. Thereafter, the remaining counts will be made in response to the frequency of the driving clock in the time interval desired, after which it will time out. In the present example, A/D conversion is provided following interval time out, but the A/D conversion is of the sample at the time it was started, so the data are commensurate with the speed. During the periods of time between successive sampling of the A/D converter, the difference between the current reading and the next preceding reading is made, to provide the difference (D) between the two pressure readings, which because it is over a constant time interval, indicates the rate of pressure change per unit of time. During the interval between samplings of the A/D converter, the difference (D) taken for each reading is compared with the difference (D) for the preceding couple of readings, so that the maximum difference is also calculated on-the-fly. However, the first reading has nothing to be subtracted therefrom, and therefore the first and second readings have nothing to be compared with. Therefore, these readings are simply used in subsequent calculations.

Also, counter two is used to save tooth counts with related oil pressures, according to the invention, for conversion at a later time, when the knee has been located, to indicate the speed of the knee. Use of odd and even base addresses with counter 2 as an index address simplifies processing in the example.

Exemplary processing may be in accordance with the following instructions:

14. Reset Counter 1
15. Reset Counter 2
16. Reset A REG
17. Reset B REG
18. Load MEM (50 ms Preset) to timer
19. Start timer
20. A/D MPX to OIL PRES; Start A/D
21. Skip one if CMPLT
22. Branch to 21
23. Load A/D to B REG
24. Skip one if Time-out
25. Branch to 20
26. Start timer
27. A/D MPX to INTAKE PRES; Start A/D
28. Skip one if CMPLT
29. Load Tooth timer to MEM (Even Ctr 2)
30. Load A/D to MEM (Odd Ctr 2)
31. Load A/D to A REG 32. Advance Counter 2
33. Subtract
34. Load RSLT to MEM (Odd Ctr 2)
35. Advance Counter 2
36. Advance Counter 2

Instruction 18 put the preset value in the timer so that whenever the timer is started it is preset to this value and will time out when the complement of it has been accumulated with clock counts. Then the timer is started in instruction 19; in the programming shown for the exemplary process herein, the starting of the timer identifies the beginning of the time interval, and at that beginning of the time interval the data is taken and the pressure data is processed. So a first pressure data point is brought in and saved in the B register in instruction 23. The second pressure data point is brought in and stored in memory and placed in the A register in instructions 30 and 31. This second data point, and the first speed data point are also loaded to memory since they must be available once the regular programming begins. Then counter 2 is advanced so as to put the difference between the second and first pressures into memory to have them available for comparison with subsequent differences. And then the counter is advanced twice to pass through the addresses where the next previous difference is normally to be stored (which normally would be brought out for comparison to see if the present difference is larger than the next previous difference), and the counter is advanced in instruction 35 a second time to pass over the storage location where the second previous value is normally to be stored.

In the general routine, taking many, many data points as the engine accelerates, the program waits for time out, when it occurs it restarts the timer, samples the A/D and the tooth timer, and stores the new pressure value in the A register for subtraction from the previous pressure value to obtain a current difference, and it stores the current pressure and tooth timer count in memory so that pressure can be subtracted from the next data value during the next pass through the program, and so pressure and speed of this point can be recorded, if this point is found subsequently to be the knee in the curve. This may be in accordance with the following instructions:

37. Skip one if time out
38. Branch to 37
39. Start timer
40. A/D MPX to OIL PRES; Start A/D
41. Skip one if CMPLT
42. Branch to 41
43. Load Tooth timer to MEM (Even Ctr 2)
44. Load A/D to MEM (Odd Ctr 2)
45. Load A/D to A REG Then counter 2 is advanced so as to point in memory to the place where the previous pressure value is stored and it is brought out to the B register and subtracted, the result being temporarily buffered in a register. The finding of each difference can be done as follows:

46. Advance Counter 2
47. Load MEM (Odd Ctr 2) to B REG
48. Subtract
49. Load RSLT to REGISTER
50. Load B REG to A REG Then the counter is advanced once again to point to the place in memory where the second next preceding pressure value is stored to bring it out for subtraction from the preceding pressure value to provide a difference for comparison with the current difference which has just been made. By subtracting the previous pressure change (or difference) from the current pressure change (or difference), a negative result will indicate that there is a tendency for decrease in the current pressure change compared to the previous one, meaning that maximum slope may have been detected in the previous pressure change. If this had happened twice in a row, then the maximum slope will be the second preceding slope which was detected, that is the second preceding difference between successive data points.

51. Advance Counter 2
52. Load MEM (Odd Ctr 2) to B REG
53. Subtract
54. Load RSLT to B REG
55. Load REGISTER to A REG
56. Subtract
57. Advance Counter 2

The actual test is made in instruction 58, and if the right relationship in the slope of the difference is not sensed, the program will reset counter 1, because counter 1 is keeping track of whether one slope is less than the preceding slope, and in case one had previously been sensed in that relationship, but the next one in the row is not, then it is thrown out and the comparison must be made two additional times in a row. Then the program goes back to the beginning to pick up the next data point. On the other hand, if a negative result is indicated, this means that the last slope to be taken is smaller than the previous one so that the proper slope relationship exists, and therefore counter 1 should be advanced in instruction 57 to keep track of the fact that one good slope relationship has been found, and then counter 1 is tested to see if it is equal to 2 because if it is that means two in a row have had the right relationship in which case it will branch to the conversion operation finishing up the routine. Otherwise, it will simply go back and pick up the next data point. This is set forth as follows:

58. Skip two if —
59. Reset Counter 1
60. Branch to 37
61. Advance Counter 1
62. Skip one if Counter 1 = 2
63. Branch to 37

Counter 2 has been left set at the address where the third previous pressure/speed pair is located. It was placed at that address so that if the second desired slope relationship in a row had been sensed (that is two slopes each less than the third preceding one) then the third preceding pessure/speed pair is the one that is desired and should be read out and used. But if the slope relationships have not yet been sensed, then the third preceding pressure and speed values are no longer needed, so that those storage locations can be used for the next data pressure and speed to be sensed.

When two proper slopes have been sensed in a row, the third pressure and speed values are read out for use, or storage in a known location, as follows:

64. Load MEM (Odd Ctr 2) to MEM (desired)

Or

65. Load MEM (Odd Ctr 2) to Print and Display

Not only the pressure, but also the speed is desired to be known at the point of the knee. One of the aspects of the present invention is that an indication of speed has been stored, but it has not been converted. Thus rapid sampling of the tooth timer and storing in the even portion of memory has been achieved, so that when the knee has finally been detected, the one of the speeds which is required can be determined. If, on the other hand, speed had been stored, conversion would have to be made which would unduly complicate and therefore lengthen the program. Depending upon the particular apparatus involved, this could add too many instruction steps to permit the rapid sampling which is desired herein. Therefore, the present invention also contemplates storing of speed indications while another parameter is being monitored, and when that parameter has indicated an interest in a preceding speed, only that preceding speed indication needs to be converted into an actual speed reading. Speed considerations are discussed hereinbefore with respect to instructions 1–13. To actually determine the speed from the counts provided by the tooth timer, the relationship is the ratio of one tooth to the total number of teeth, which is divided by the ratio of the counts to the frequency (the frequency in turn having to be first divided by 60 to yield a result in rpm's). Rewritten this results in the frequency of the clock times 60, all of which is divided by the total number of flywheel teeth times the counts in the timer, which may be achieved, according to the following instructions:

66. Load MEM (Freq) to A REG
67. Load MEM (RGT) to B REG
68. Divide
69. Load RSLT to A REG
70. Load 60 Factor to B REG
71. Multiply
72. Load RSLT to A REG
73. Load MEM (Even Ctr 2) to B REG
74. Divide
75. Load RSLT to MEM (wherever desired)

Or

75a. Load RSLT to Print and Display

The present invention is not concerned with the particular data processing apparatus which is used, nor with the programming required therefore. The invention in its broadest sense relates to saving speed indications, when the desired one is not known until processing has proceeded over a number of samples or a time interval after each speed sample is made, the speed samples being stored as an indication other than speed, and once the processing of the other parameter has indicated which speed is desired, only a single conversion of that speed is made. In a different sense, the invention relates to significant improvements in engine oil system tests because the invention provides, without a dynomometer, tests of the oil pressure regulator, of engine restriction, of pump health, and of bearing wear or the like. The oil tests of the invention could, if desired, be performed by special purpose apparatus (when not incorporated in an overall diagnostic system), and the apparatus could in fact be implemented in an analog fashion if simple apparatus is desired and great accuracy is not required.

Similarly, although the invention has been shown and described with respect to exemplary embodiments thereof, it should be understood by those skilled in the art that the foregoing and various other changes, additions and omissions may be made therein and thereto without departing from the spirit and the scope of the invention.

Having thus described typical embodiments of our invention, that which we claim as new and desire to secure by Letters Patent is:

1. In the method of testing the oil system of an internal combustion engine, the steps of:
accelerating an engine while loaded only with its own inertia, drag and accessory loads;
measuring a rate of change of pressure as the engine accelerates;
determining a decreasing slope in said rate; and
determining the oil pressure and the engine speed at the determined point of decreasing slope.

2. The method according to claim 1 wherein the rate of change of oil pressure with respect to time is monitored as the engine accelerates, and a decrease in the rate is taken as the determined point of decreasing slope.

3. The method according to claim 2 wherein the rate of change of oil pressure is determined by sampling the oil pressure in equal time intervals and subtracting each sample from a succeeding sample.

4. Apparatus for testing the oil pressure system in an internal combustion engine as the engine accelerates while loaded only by its own inertia, drag and accessory loading, comprising:
pressure sensing means adapted to be disposed to sense the pressure of the lubricating oil in the engine and provide a pressure signal indicative thereof;
speed sensing means adapted to be disposed to sense the rotation of the engine and to provide a speed signal indicative of the speed thereof; and
processing apparatus comprising means for sampling said pressure signal and providing pressure manifestations indicative of the pressure represented thereby a number of times during a time interval while the engine is accelerating and for determining the pressure at which the rate of oil pressure rise with speed begins to decrease.

5. Apparatus according to claim 4 wherein said processing apparatus also comprises means for determining the speed at which the rate of oil pressure rise begins to decrease.

6. Apparatus according to claim 4 wherein said processing apparatus comprises means for sampling the rise in pressure as a function of time and for determining the pressure at which the rise in pressure with respect to time begins to decrease.

7. The method of providing an indication, in speed dimensions, of the speed at which an engine parameter other than speed has a particular relationship, by sampling an indication of engine speed in non-speed dimensions contemporaneously with sampling of the other parameter, repetitively, processing the other parameter through sufficient samplings thereof to determine the desired relationship while saving the indications of speed in non-speed dimensions, and when the desired relationship has been determined, converting to speed dimensions only the particular speed indication relating to the parameter determined to have the proper relationship.

8. In the method of diagnosing an internal combustion engine, the steps of:
simultaneously sampling indications of speed in non-speed dimensions and indications of another parameter, repetitively, over a sufficient number of samplings so as to show a trend in the values of said other parameters being sampled;
determining, from the trend, a parameter value of interest; and
converting to speed dimensions the speed indication samples simultaneously with the parameter value of interest.

9. Apparatus for diagnosing an internal combustion engine, comprising:
- a transducer adapted to be disposed with respect to the engine to sense a particular parameter, said parameter having a characteristic profile with a point of interest thereon which can be determined by analysis of several samples of said parameter including said point of interest;
- speed sensing means, adapted to be disposed for response to mechanical movement of a portion of the engine in relationship to the angular revolutions of the engine, for providing successive measured data manifestations of the time elapsed during angular revolution of the engine through a known angle and therefore indicative of the speed of the engine as the engine rotates; and
- processing apparatus including means for repetitively taking samples of said transducer and of said measured data manifestations and for storing said measured data mainfestations for at least the interval of said several samples, for analyzing successive samples derived from said transducer and determining a sample of interest and for converting the one of said measured data manifestations relating to said sample of interest into a manifestation of speed expressed in speed dimensions.

* * * * *

UNITED STATES PATENT AND TRADEMARK OFFICE
CERTIFICATE OF CORRECTION

PATENT NO. : 4,064,746
DATED : December 27, 1977
INVENTOR(S) : Henry J. Mercik, Jr.; Lee R. Armstrong It is certified that error appears in the above-identified patent and that said Letters Patent are hereby corrected as shown below:

Column 2, line 24 "diagramatic" should read --diagrammatic--

Column 7, line 13 "kneee" should read --knee--

Column 7, line 16 "occuring" should read --occurring--

Column 7, line 41,42 "revolusions" should read --revolutions--

Column 8, line 18 "20C" should read --20c--

Column 12, line 3 "of pressure" should read --of oil pressure--

Signed and Sealed this

Twenty-second Day of August 1978

[SEAL]

Attest:

RUTH C. MASON
Attesting Officer

DONALD W. BANNER
Commissioner of Patents and Trademarks